(12) United States Patent
Zhou et al.

(10) Patent No.: US 10,771,954 B2
(45) Date of Patent: Sep. 8, 2020

(54) ROAM PREVENTION FOR STATIONARY CLIENT DEVICES IN AREAS OF ACCESS POINT COVERAGE OVERLAP

(71) Applicant: HEWLETT PACKARD ENTERPRISE DEVELOPMENT LP, Houston, TX (US)

(72) Inventors: Qiang Zhou, Beijing (CN); Sachin Ganu, San Jose, CA (US); Guangzhi Ran, Beijing (CN); Jianpo Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/966,393

(22) Filed: Apr. 30, 2018

(65) Prior Publication Data
US 2019/0335317 A1 Oct. 31, 2019

(51) Int. Cl.
| | | |
|---|---|---|
| *H04L 12/16* | (2006.01) | |
| *H04L 12/26* | (2006.01) | |
| *H04L 12/28* | (2006.01) | |
| *H04W 8/12* | (2009.01) | |
| *H04W 24/08* | (2009.01) | |
| *H04W 88/08* | (2009.01) | |

(52) U.S. Cl.
CPC ............ *H04W 8/12* (2013.01); *H04W 24/08* (2013.01); *H04W 88/08* (2013.01)

(58) Field of Classification Search
CPC ........ H04W 8/12; H04W 24/08; H04W 88/08
See application file for complete search history.

(56) References Cited

U.S. PATENT DOCUMENTS

| | | | | |
|---|---|---|---|---|
| 7,389,111 | B2* | 6/2008 | Petrus | H04W 24/00 455/436 |
| 7,440,756 | B1* | 10/2008 | Wang | H04W 48/20 455/436 |
| 7,864,736 | B2 | 1/2011 | Yashar et al. | |
| 8,427,942 | B2 | 4/2013 | Kim et al. | |
| 8,553,650 | B2* | 10/2013 | Veres | H04W 36/32 370/331 |
| 8,699,392 | B2 | 4/2014 | Mitra et al. | |

(Continued)

FOREIGN PATENT DOCUMENTS

WO 2012/166033 A1 12/2012

OTHER PUBLICATIONS

Mohsen et al. (an efficient femtocell to femtocell handover decision Algorithm in LTE Femtocell Networks, 2015) (Year: 2015).*

(Continued)

*Primary Examiner* — Maharishi V Khirodhar
(74) *Attorney, Agent, or Firm* — Hewlett Packard Enterpise Patent Department (57) ABSTRACT

An example of controlling a network of wireless access points (APs) to detect that a client device associated with the network is stationary in an AP-overlap area, and in response to the detection that the client device is stationary in the AP-overlap area, assigning one of the APs to be a preferred AP for the client device. The APs are to avoid connecting with any client devices that have been assigned another AP as a preferred AP. Thus, the stationary client device in the overlap area may be prevented from undesired roaming.

20 Claims, 7 Drawing Sheets

(56) References Cited

U.S. PATENT DOCUMENTS

| | | | |
|---|---|---|---|
| 9,137,727 B2 | 9/2015 | Kulkarni | |
| 9,210,587 B2* | 12/2015 | Sankaranarayanan | H04W 4/06 |
| 9,479,990 B1 | 10/2016 | Chen et al. | |
| 2007/0077928 A1* | 4/2007 | Kim | H04W 36/30 |
| | | | 455/436 |
| 2008/0063002 A1 | 3/2008 | Zheng et al. | |
| 2008/0219208 A1 | 9/2008 | Adams et al. | |
| 2010/0027510 A1* | 2/2010 | Balasubramanian | H04W 48/18 |
| | | | 370/332 |
| 2010/0130206 A1* | 5/2010 | Chin | H04W 36/30 |
| | | | 455/436 |
| 2010/0304745 A1* | 12/2010 | Patel | H04W 52/143 |
| | | | 455/435.1 |
| 2012/0258720 A1* | 10/2012 | Tinnakornsrisuphap | H04W 36/04 |
| | | | 455/442 |
| 2014/0099941 A1* | 4/2014 | Ji | H04W 16/14 |
| | | | 455/423 |
| 2014/0274044 A1* | 9/2014 | Lee | H04W 48/16 |
| | | | 455/434 |
| 2015/0208323 A1* | 7/2015 | Joung | H04W 48/06 |
| | | | 455/435.1 |
| 2016/0198372 A1 | 7/2016 | Singh et al. | |
| 2016/0198385 A1* | 7/2016 | Braun | H04W 36/0094 |
| | | | 455/437 |
| 2016/0350368 A1* | 12/2016 | Weyerhaeuser | G06F 16/25 |
| 2016/0360368 A1* | 12/2016 | Marti | H04W 4/025 |

OTHER PUBLICATIONS

Jung Min et al. (Efficient group handoff decision algorithm for wireless networks with mobile access points, 2011) (Year: 2011).*

Zainab et al. (A mobility aware handoff trigger scheme for seamless connectivity in cellular networks, 2004) (Year: 2004).*

Nishith et al. (Radio resource management in cellular systems 2001). (Year: 2001).*

Cisco, "Channel Planning Best Practices," Jul. 27, 2017, pp. 1-4 (online), Retrieved from the Internet on Aug. 11, 2017 at URL: <documentation.meraki.com/MR/WiFi_Basics_and_Best_Practices/Channel_Planning_Best_Practices>.

European Search Report Received for EP Patent Application No. 19164837.7, dated Sep. 16, 2019, 9 pages.

* cited by examiner

ROAM PREVENTION FOR STATIONARY CLIENT DEVICES IN AREAS OF ACCESS POINT COVERAGE OVERLAP

BACKGROUND

Some wireless networks may include multiple access points ("APs"), for example to broaden the overall coverage region of the network and/or improve signal strength. In some such wireless networks, the APs may be distributed in a manner that results in some of their individual coverage regions overlapping one another. For example, to ensure that locations within a desired overall coverage zone receives adequate signal strength, the APs may need to be deployed in a manner that results in such AP coverage overlap areas.

DETAILED DESCRIPTION

When the coverage regions of multiple APs overlap, this can result in there being areas in which of the two (or more) strongest AP signals received in that area are approximately the same strength as one another. Such areas may be referred to generally herein as "AP overlap areas", and the APs whose signals cause the overlap area may be referred to herein as "overlapping APs".

AP overlap areas in a wireless network may give rise to some difficulties. For example, when a client device is located in an AP overlap area and is stationary, the client device may repeatedly switch which of the overlapping APs it is connected to. The behavior of a client device switching which AP it is connected to is referred to herein as "roaming." Each time that a client device roams between APs, this causes a communications overhead and a processing overhead, and therefore this repeated roaming may create a significant burden on the network.

In some circumstances, the benefits associated with a roaming event may be worth the cost of the overhead—for example, when a client device is moving about in the wireless network, roaming may be a desired occurrence. For example, if a client device is connected to a first AP and then moves away from the first AP to a location where a second AP would be able to provide better service (e.g., a stronger signal), then it may be desirable for the client device to roam from the first AP to the second AP. Although such a roam does produce some overhead, it may be worth the cost in view of the better service the client device will receive.

However, when a client device is stationary in an AP overlap area, there may be little to no benefit that results from the client device roaming between APs. In particular, because the client is stationary in an AP overlap area, by definition the respective signals of the overlapping APs will have similar strengths to one another. Thus, the client device would see very little to no signal strength improvement from roaming between the overlapping APs. Thus, the overhead that results from the roaming of a stationary client device in an AP overlap area is likely not worth the cost.

Not only does a roaming event by a stationary client device in an overlap area create overhead that is not worth its cost, it is possible for situations to arise in which such roaming occurs excessively, thus multiplying the overhead that is created. In particular, a single stationary client device in an AP overlap area may repeatedly change which of the overlapping APs it is connected to. In some examples, this repeated roaming in the overlap area may occur because in the AP overlap area the signals of the overlapping APs may have approximately equal strengths. Over time, the signal strengths of the overlapping APs in the overlap area may vary slightly, for example due to natural fluctuations such as those caused by noise or other transient channel conditions. Thus, the AP that has the strongest signal for a client device may change repeatedly if the client device stays in the overlap area long enough, resulting in the client device roaming repeatedly. This is not generally a problem for moving client devices, since they will generally pass through the overlap area in a relatively brief period of time, but a stationary client device will likely stay in the AP overlap area long enough to possibly experience multiple roams. Thus, even a single stationary client device in an overlap area may cause a significant amount of overhead, and this may be multiplied many fold in a large wireless network with many APs and many connected client devices.

Accordingly, various example techniques for controlling a wireless network that address these difficulties, and example devices that employ these techniques, are described herein. In particular, in examples described herein, a wireless network may be configured to detect any client devices that are stationary in an AP overlap area. When such a client device is identified, the wireless network may select one of the overlapping APs and assign it as a preferred AP for the client device. Once a preferred AP is assigned to the client device, the other overlapping APs will avoid connecting with the client device. Thus, the stationary client device within the overlap area will be prevented from roaming, since only its preferred AP will allow it to connect. The wireless network may continue to monitor the client device for movement, and may clear the preferred AP assignment if the client device starts to move, thus allowing roaming to resume. The operations that are performed while employing these techniques may be referred to herein for simplicity as "roam prevention operations".

Detailed examples of the aforementioned techniques and devices will now be described with reference to the Figures.

1. Example Wireless Network

Figure 1:
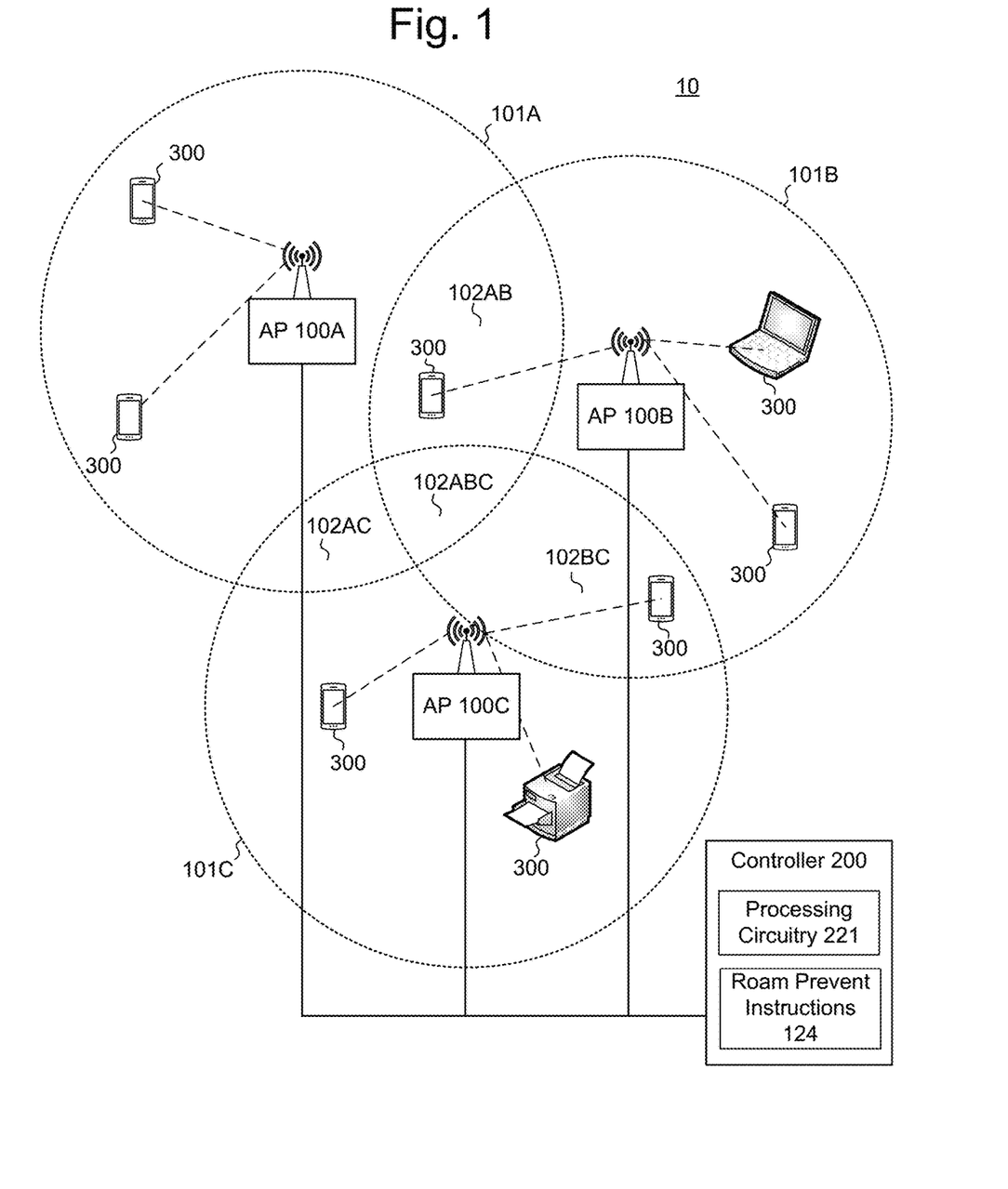
FIG. 1 is a block diagram illustrating an example network of wireless access points (APs).

FIG. 1 illustrates an example wireless network 10. The example wireless network 10 includes multiple access points (APs) 100. In some examples, the wireless network 10 may include a controller 200, which may be connected to the APs 100, while in other examples the controller 200 may be omitted, as described in greater detail below. The wireless network 10 may also include various additional network devices, such as switches, routers, bridges, repeaters, etc., which are not described in detail herein since they are not relevant to the techniques disclosed herein.

The wireless network 10 may be configured to wirelessly communicate with client devices 300, which are wirelessly connected to the APs 100, and may connect the client devices 300 to one another and/or to other networks (such as an intranet, the Internet, etc.) (not illustrated). For example, the wireless network 10 may be (or be part of) a Wireless Local Area Network (WLAN). As used herein, a WLAN can, for example, refer to a communications network that links two or more devices using some wireless distribution method (for example, spread-spectrum or orthogonal frequency-division multiplexing radio), and also usually providing a connection through an AP to the Internet. Thus, a WLAN may provide users with the mobility to move around within a local coverage area and still stay connected to the network.

The client devices 300 may be any electronic devices that are capable of wirelessly communicating with the APs 100. For example, in examples in which the APs 100 are IEEE 802.11 based APs (i.e., WiFi APs), the client devices 300 may be any devices that are capable of IEEE 802.11 based wireless communication. For example, the client devices 300 may be mobile phones, tablets, laptop computers, personal-digital-assistants (PDAs), smart devices (e.g., smartphones, tablets, smart watches, smart bands, smart glasses, etc.), Bluetooth devices, internet-of-things (IoT) embedded devices (e.g., printers, cameras, sensors, etc.), networking devices (e.g., wireless extenders, wireless bridges, etc.), and so on.

In FIG. 1, three APs 100 are shown for purposes of illustration, namely APs 100A, 100B, and 100C, but it should be understood that any number of APs 100 greater than or equal to two may be included in the wireless network 10. The APs 100 of the network 10 are arranged such that there is at least one overlap area 102. Speaking generally, an overlap area 102 is an area that is covered by multiple AP coverage zones 101 and in which a set of the strongest AP-to-client signals in the area—which includes at least the two strongest AP-to-client signals—all have approximately similar signal strength values as one another (i.e., their signal strength values are all within a threshold "TH" of one another). In other words, an overlap area 102 is an area in which there is an approximate tie between two or more APs 100 for which AP 100 has the strongest signal.

In FIG. 1, four AP overlap areas 102 are shown for the sake of illustration, namely AP overlap areas 102AB, 102AC, 102BC, and 102ABC, where the letters following the number "102" indicate which APs 100 are overlapping in that area 102. It should be understood that the illustration of overlap areas 102 in FIG. 1 is merely conceptual to aid in understanding, and is not intended show accurately or to-scale the literal shapes/configurations of the AP overlap areas 102. In particular, in actual practice, an AP overlap area 102 between two or more APs 100 is not necessarily going to include the entire region contained by the intersection of the APs 100 respective coverage areas 101, and might include areas outside this intersection.

Figure 2:
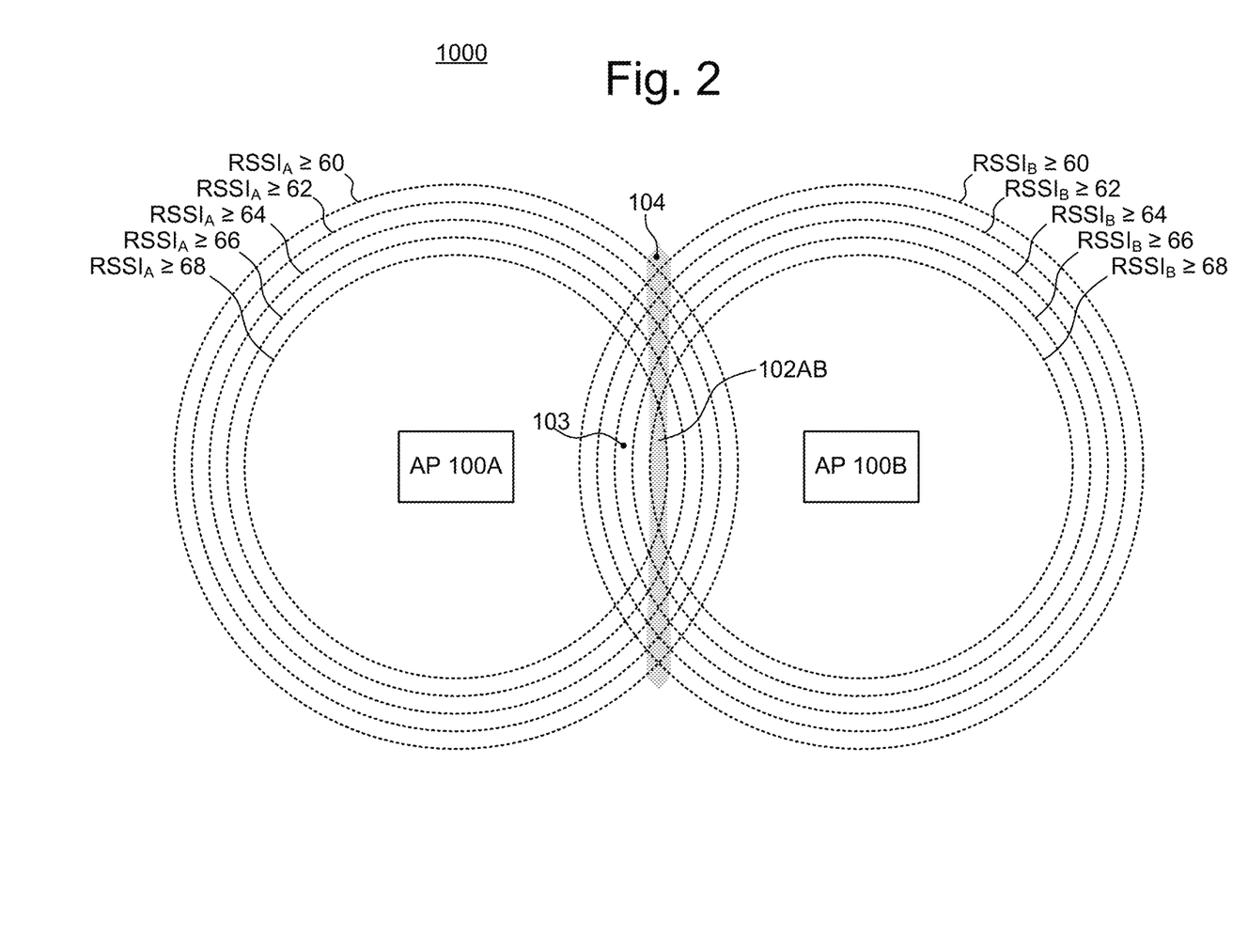
FIG. 2 is a diagram illustrating an AP coverage overlap area between two APs.

More specifically, in some examples, the AP overlap area 102 between two APs 100 may look more like the shaded area illustrated in FIG. 2. In FIG. 2, the dashed circles represent contours of signal strength for two APs 100, where the spacing between the contours equals the threshold TH. In the example shown in the Figure the threshold TH is 2, and the signal strength is measured as RSSI. As can be seen in FIG. 2, there may be locations, such as the location 103, that receive relatively strong signals from both APs 100A and 100B, and yet are not part of the overlap area 102AB since the strongest signal received at this location (i.e., the signal from AP 100A) exceeds the next strongest signal received at this location (i.e., the signal from AP 100B) by more than threshold TH. Similarly, there may be locations, such as the location 104, that receive relatively weak signals from the APs 100A and 100B, and yet are still part of the overlap area 102AB since the strongest signals received at this location are within the threshold TH of one another.

As noted above, in some examples the wireless network 10 includes a controller 200, while in other examples the controller 200 may be omitted. These various examples are described in greater detail below.

In some example networks 10 that include a controller 200, the controller 200 may control all of the operations of the APs 100, in which case the APs 100 may be so-called "thin" APs that include diminished control circuitry 120 or even omit the control circuitry 120. In other example networks 10 that include a controller 200, the controller 200 may control a subset of the operations of the AP 100 and the individual APs 100 may retain control over other operations. In some examples that include the controller 200, the controller 200 may perform the roam prevention techniques/operations described herein.

In some example networks 10 that include a controller 200, the controller 200 may be an on-premises appliance (not illustrated) that is connected to and controls the APs 100. In some such examples, the controller 200 may be connected between the APs 100 and an external network (such as the Internet), such that data communications between the APs 100 and the external network pass through the controller 200. In other examples, the APs 100 may be connected to an external network without the controller 200 as an intermediary. Examples of such controllers 200 include so-called WLAN Controllers and AP Controllers. In some examples, controller 200 may be a virtual controller residing on an AP that is elected to be a master in a cluster of APs.

In other example systems 10 that include a controller 200, the controller 200 may be an off-premises appliance that is connected to the APs 100 via an external network (e.g., via the Internet). For example, the controller 200 may be a cloud appliance, which may be operated, for example, by a third party (e.g., a cloud service provider, the vendor of the APs 100, etc.).

In examples in which a controller 200 is provided (regardless of whether it is on-premises (e.g., a WLAN Controller) or off-premises (e.g., a cloud appliance)), the controller 200 may include processing circuitry 221 that is configured to perform some or all of the roam prevention operations described herein. For example, the controller 200 may include the roam prevention instructions 124, which when executed by a processor (physical or virtualized) of the controller 200, cause it to perform the roam prevention operations.

In some example networks 10 in which the controller 200 is omitted, all of the operations of each AP 100 may be controlled by their own respective control circuitry 120 (described below) (e.g., the AP 100 may be a so-called "fat" AP). In such examples, the roam prevention operations described herein may be performed by any one (or multiple) of the APs 100. One difficulty of this approach may be that an AP 100 may not normally have all of the information it may need in order to perform the roam prevention operations. To address this difficulty, the APs 100 may be connected with one another such that they are able to coordinate with one another in performing the roam prevention operations, for example by sharing the needed information with each other. Another difficulty of this approach is that, without a top-down control system, the APs 100 may conflict with one another, for example, in assigning or clearing preferences for client devices. To address this difficulty, the APs may utilize a distributed decision making tool, such as a distributed key value store, to prevent or resolve such conflicts.

In other example networks 10 in which the controller 200 is omitted, the APs 100 may be nodes of a distributed system, together with other APs 100. The distributed system may form a virtualized controller (not illustrated) that controls all of the APs 100 that are members of the distributed system. Thus, in such examples, control plane operations may be distributed across the processing circuitry of multiple APs 100, rather than each AP 100 controlling just itself. In such examples, some or all of the roam prevention operations described herein may be performed by the virtual controller. More specifically, one, some, or all of the APs 100 may include the roam prevention instructions 124, and may execute these instructions as the virtual controller.

2. Example Roam Prevention Operations

Figure 3:
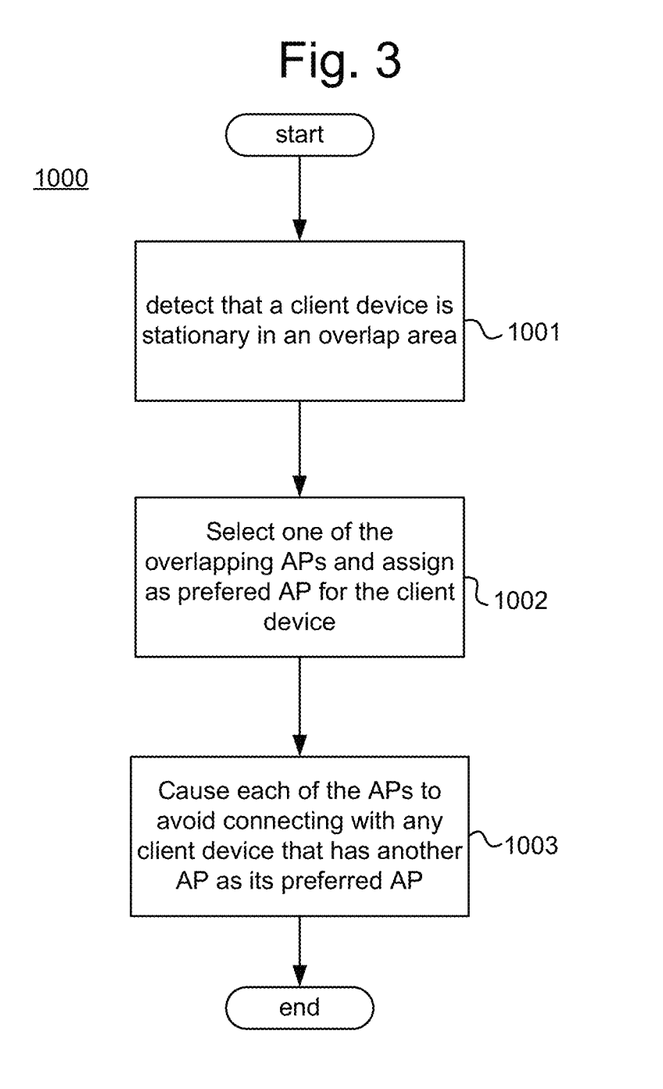
FIG. 3 is a process flow diagram illustrating an example process of detecting stationary client devices in overlap areas and preventing them from roaming.
Figure 4:
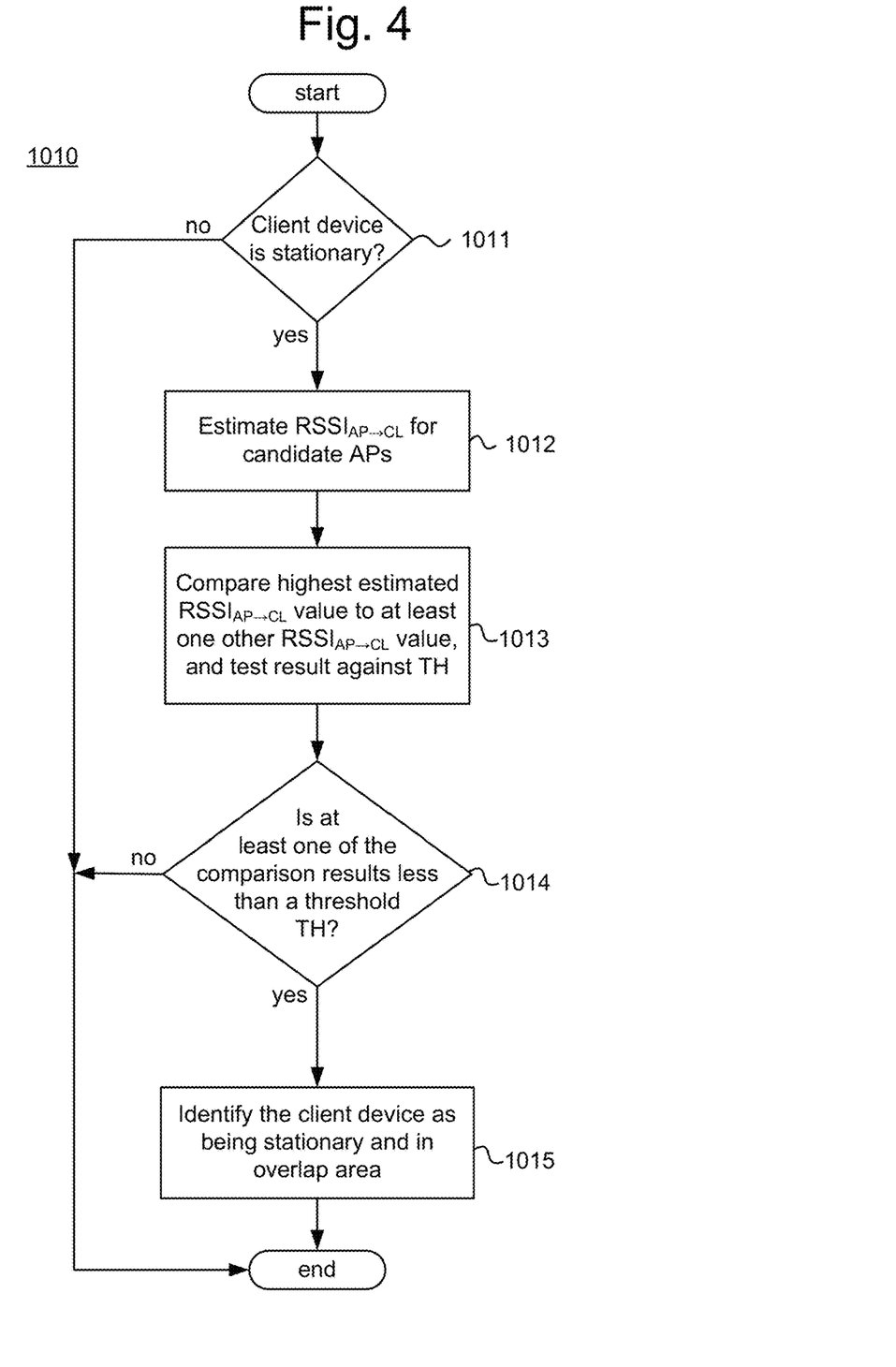
FIG. 4 is a process flow diagram illustrating an example process of determining whether any client devices are stationary and in AP coverage overlap areas.
Figure 5:
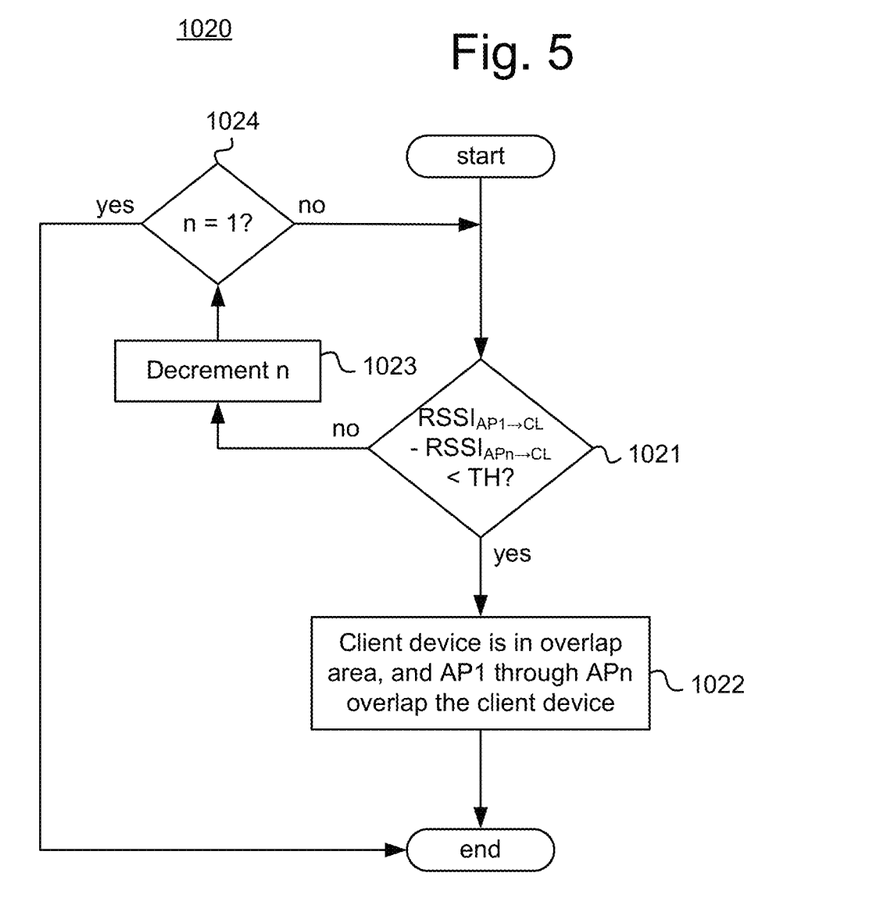
FIG. 5 is a process flow diagram illustrating an example process of identifying an overlap area and which APs are overlapping in the overlap area.

FIG. 3 illustrates an example process 1000 of detecting stationary client devices in overlap areas and preventing them from roaming. FIG. 4 illustrates an example process 1010 of determining whether any client devices are stationary and in overlap areas. FIG. 5 illustrates an example process 1020 of identifying an overlap area and which APs are overlapping in the overlap area.

The example processes 1000, 1010, and 1020 may be performed by control circuitry of an AP (such as the control circuitry 120 described above), by an external controller that controls an AP (such as the external controller 200 described above), by a virtual controller that controls an AP, or by any combination of these. For example, one or more processors included in the AP, in an external controller, and/or in another AP, may perform the processes 1000, 1010, and 1020 as a result of executing machine readable instructions corresponding to the operations described below (such as the roam prevention instructions 124). The entity that performs the processes 1000, 1010, and 1020 will be referred to below generically as a "controller", which should be understood broadly to include any combination of control circuitry of an AP, an external controller, and/or a virtual controller.

In describing the processes 1000, 1010, and 1020, Received Signal Strength Indicator (RSSI) will be used as an indicator of the strength of a signal, but in practice any signal strength measure may be used, such as decibels, received channel power indicator (RCPI), dBm, etc. In addition, the nomenclature $RSSI_{AP \to CL}$ will be used to indicate the signal strength of signals from a given AP to a given client device as seen at the client device (i.e., AP-to-client signal-strength values), while $RSSI_{CL \to AP}$ will be used to indicate the signal strength of signals from a given client device to a given AP as seen at the AP (i.e., client-to-AP signal-strength values). When it is desired to identify a signal strength associated with a particular AP, a number will be added after "AP" to designate the AP; for example, $RSSI_{AP \to CL}$ indicates and AP-to-client signal-strength value for AP1.

2.1 Example Process of Detecting Stationary Client Devices in Overlap Areas and Preventing them from Roaming Turning now to the process 1000, in block 1001 controller detects that a client device is stationary and is in an AP overlap area. The controller may detect that the client device is in an AP overlap area in various ways.

For example, the controller may detect that the client device is in an AP overlap area because a set of the highest AP-to-client signal strengths—including at least the two highest signal strengths—are sufficiently close to one another (i.e., they satisfy a comparison to a threshold TH). In other words, an AP overlap area in these examples is a location at which at least the two strongest received signals are approximately equal in strength. One specific example of such an approach is described in greater detail below in relation to the process 1010, and in some examples, the detection of block 1001 may occur as the result of executing the process 1010.

As another example, the controller may detect that the client device is in an AP overlap area because at least the two smallest physical distances between the client device and APs are sufficiently close to one another (i.e., they satisfy a comparison to a threshold TH'). In other words, an AP overlap area in these examples is a location that is approximately equidistant to at least the two closest APs to it. The distances between the client device and the APs may be estimated by estimating the location of the client device and comparing this to known locations of the APs. In these examples, a distance to the AP may serve as a substitute for signal strength. However, in some circumstances, a distance to an AP is not always an accurate indicator of the signal strength received from the AP, and thus these approaches might be less accurate in some circumstances than the above-noted approaches that compare signal strengths.

As another example, the controller may detect that the client device is in an AP overlap area because the client device roams more than a specified number of times while stationary within a specified period of time. In other words, rather than identifying an overlap area by comparing signal strengths or distances, the controller may infer that the client device is in an AP overlap area from the fact that the stationary client device is excessively roaming while stationary. This approach may be beneficial in that it might require less processing power than other approaches; however, it may also be less accurate than the other approaches in some circumstances.

As another example, the controller may detect that the client device is in an AP overlap area because the client device is in the radio frequency (RF) coverage area of more than one APs. A RF coverage area is an area in which a client device can receive signals from multiple APs that have a signal strength about a specified threshold value. This approach may be more inclusive in the client devices that it assigns preferred APs to than the approaches described above, which may be a benefit or a determinant depending on the circumstances.

In block 1002, the controller, in response to detecting the client device is stationary and is in an overlap area, selects one of the APs that overlaps the client device and assigns it as a preferred AP for that client device. The controller may select one of the overlapping APs based on any criteria. For example, the controller may select the AP that currently provides the strongest signal at the client device, which may be estimated by the controller as described below in relation to FIG. 4. As another example, the controller may select the AP that the client device is currently connected to. As another example, the controller may select the AP that the client device has been connected to the most times within a specified period of time. As another example, the controller may select the AP randomly. As another example, the controller may select the AP based on the respective loads of the overlapping APs so as to balance or otherwise optimize AP loads.

In block 1003, the controller may cause each of the APs to avoid connecting with any client device that has another AP as its preferred AP. For example, in some implementations the controller may directly control which client devices each AP connects to, in which case the controller may perform the operations of block 1003 by directly controlling the non-preferred APs to prevent them from connecting to the client device. As another example, in some implementations the APs may individually control which client devices they connect to and may be configured to automatically avoid connecting with client devices that have another AP as their preferred AP, in which case the controller may perform the operations of block 1003 by communicating the fact that the client device has been assigned another AP as a preferred AP to the non-preferred APs. In examples in which the client device is already connected to an AP that is not its preferred AP, this AP may be caused to disconnect from the client device (either under the direct control of the controller, or automatically in response to being notified by the controller that the client device has a preferred AP).

Thus, as a result of performing the process 1000, a client device that is stationary in an overlap area may be automatically prevented from roaming. In some examples, the controller may continue to monitor client devices that have been assigned a preferred AP, and may clear (remove) the preference if the client device starts moving.

2.2 Example Process of Determining Whether any Client Devices are Stationary and in Overlap Areas The process 1010 of FIG. 4 will now be explained. The process 1010 is a process for determining whether any client devices are stationary and in an overlap area. In some examples, the process 1010 may be performed continuously or periodically to ensure that any changes in the network (such as client devices beginning to move or ceasing to move) are accounted for. In the process 1010 an AP overlap area may be defined as any area in which at least the two highest AP-to-client signal strengths are sufficiently close to one another (i.e., they satisfy a comparison to a threshold TH). In other words, an AP overlap area in these examples is a location at which at least the two strongest received signals are approximately equal in strength.

In block 1011 the controller determines whether any client devices (among a set of eligible client devices) are stationary. If so, then the process continues to block 1012 for each stationary client. If not, then the process ends.

In some examples, the set of eligible client devices mentioned above may exclude any of the client devices in the network that have recently (i.e., within a specified time period) had the operations of blocks 1012-1014 performed for them and/or that have a preferred AP. In other words, if it was recently determined that a particular stationary client device is or is not in an overlap zone, then there may be no need to make such a determination again until some time has passed or until some change is detected (like the device starting to move), and thus such a device may be excluded in block 1011.

The controller may detect that a client device is stationary as part of block 1011 by any method. For example, the controller may monitor the location of the client device and determine whether its location changes more than a specified threshold amount. Various methods are known for determining the location of a client device in a wireless network, such as RSSI based methods and round-tripe-time (RTT) based methods, and any such method may be used.

As another example, the controller may detect that the client device is stationary as part of block 1011 by, for example, determining a series of signal strength vectors for the client device based on probe reports collected from the APs over time. The controller may then determine distances between a first signal strength vector and the other signal strength vectors in the series (any mathematical measure of distance may be used, such as Euclidean Distance, Minkowski Distance, etc.). If none of these distances between the signal strength vectors for the client device exceed a specified threshold, then the client device may be identified as stationary. This approach may be advantageous in that it does not require the controller to have explicit knowledge of the location of the client device.

In block 1012, the controller estimates, for a set of candidate APs, the AP-to-client signal strength between the AP and the client device (e.g., $RSSI_{AP \rightarrow CL}$). If the controller is aware of AP-to-client signal strengths that were actually measured by the client device, then the controller may use these actual values as the estimates. However, generally the controller does not have this information, and therefore the controller may estimate the signal strengths based on information that the controller does have. For example, the controller may estimate the AP-to-client signal strength for the $n^{th}$ AP as:

$$RSSI_{APb \rightarrow CL} = Txpower_{APn} + RSSI_{CL \rightarrow APn} \quad \text{(eq. 1)}$$

where $Txpower_{APn}$ is the transmission power of the $n^{th}$ AP and $RSSI_{CL \rightarrow APn}$ is taken from management frames sent from the client device to the $n^{th}$ AP.

The validity of using equation 1 for estimating client-side RSSI is justified as follows. $RSSI_{CL \rightarrow APn}$ is assumed to be given by:

$$RSSI_{CL \rightarrow APn} = Txpower_{CL} - Passloss_{CL \rightarrow APn} \quad \text{(eq. 2)}$$

where $Txpower_{CL}$ is the transmit power of the client device and $Passloss_{CL \rightarrow APn}$ is the passloss from the client device to the $n^{th}$ AP. Similarly, $RSSI_{APn \rightarrow CL}$ is assumed to be given by:

$$RSSI_{APn \rightarrow CL} = Txpower_{APn} - Passloss_{APn \rightarrow CL} \quad \text{(eq. 3)}$$

where $Txpower_{APn}$ is the transmit power of the $n^{th}$ AP and $Passloss_{APn \rightarrow CL}$ is the passloss from the $n^{th}$ AP to the client device. It may be assumed that the passloss is approximately the same in both directions, and therefore $Passloss_{CL \rightarrow APn} = Passloss_{APn \rightarrow CL}$. Thus, equations 1 and 3 may be combined, yielding:

$$RSSI_{APn \rightarrow CL} = Txpower_{APn} + RSSI_{CL \rightarrow APn} - Txpower_{CL}. \quad \text{(eq. 4)}$$

Because $RSSI_{APn \rightarrow CL}$ is taken from management frames, which generally are transmitted at a lowest data rate and transmit power, it can be assumed that $Txpower_{CL}$ is the same value for each of the APs, and therefore this value can be omitted from equation 4, thus yielding equation 1.

In some examples, the RSSI values are estimated for every AP in the candidate set. In other examples, the RSSI values may be estimated for less than all of the APs in the candidate set. For example, RSSI values may be estimated as they are needed, and depending on the results of the comparisons of block 1013 the RSSI value for some APs may be unneeded.

In some examples, the candidate APs for which RSSI values are estimated in block 1012 include all of the APs in the network. In some examples, the candidate APs include all those APs that are capable of connecting to the particular client device (i.e., the AP can detect a signal from the client device). In some examples, the candidate APs include just those APs that the particular client device has connected to recently (i.e., within some specified period of time). In some examples, the candidate APs include just those APs for which $RSSI_{CL \rightarrow AP}$ is greater than a specified threshold.

The N RSSI values from block 1012 may be labeled hereinafter according to their relative strength, with the index n=1 representing the strongest signal (highest RSSI value) and the index N representing the weakest signal (lowest RSSI value). Thus, $RSSI_{AP1 \rightarrow CL}$ is the strongest estimated signal, $RSSI_{AP2 \rightarrow CL}$ is the second strongest estimated signal, and so on until $RSSI_{APN \rightarrow CL}$, which is the weakest signal (among the candidate APs).

In block 1013 the controller may compare the highest estimated strength value $RSSI_{AP1 \rightarrow CL}$ to at least one other $RSSI_{AP \rightarrow CL}$ value, and test the result against the threshold TH. The comparison between the $RSSI_{AP \rightarrow CL}$ values may be any type of comparison that is indicative of their relative magnitudes. For example, the controller may compare two $RSSI_{AP \rightarrow CL}$ values by subtracting them from one another. As another example, the controller may compare two $RSSI_{AP \rightarrow CL}$ values by taking a ratio of the two values (i.e., dividing one by the other).

In some examples, the controller may compare the highest value $RSSI_{AP1 \rightarrow CL}$ to the lowest value $RSSI_{APN \rightarrow CL}$ (among the candidate APs), and may test this result against the threshold TH. In some of these examples, this may be the sole comparison that is performed—that is, if the comparison of $RSSI_{AP1 \rightarrow CL}$ to $RSSI_{APN \rightarrow CL}$ fails the threshold test, then it is determined that the client device is not in an overlap area, without testing the other RSSI values. In others of these examples, if the first comparison fails the threshold, then additional comparisons may be performed, in increasing order of magnitude of RSSI, until one of the comparisons (if any) satisfies the threshold test. An example of the latter approach is described below in greater detail in relation to FIG. 5.

In some examples in which only the lowest value $RSSI_{APN \rightarrow CL}$ is compared to the highest value $RSSI_{AP1 \rightarrow CL}$, the set of candidate APs may first be narrowed down to include less than all of the APs—for example, the set of candidate APs may include just those APs to which the client device has roamed recently (i.e., within a specified period of time).

In other examples, the controller may first compare the highest value $RSSI_{AP1 \rightarrow CL}$ to the second highest value $RSSI_{AP2 \rightarrow CL}$, and then may compare $RSSI_{AP1 \rightarrow CL}$ to the third highest value $RSSI_{AP3 \rightarrow CL}$, and so on in decreasing order of magnitude. The results of these comparisons may be tested against the threshold TH. In other words, an iterative process occurs in which each iteration $RSSI_{AP1 \rightarrow CL}$ is compared to $RSSI_{APn \rightarrow CL}$ and the result is tested against TH, starting with n=1 and incrementing n with each iteration. In some of these examples, the controller may cease this iterative series of comparisons once one of the comparison results fails to satisfy the threshold TH. This may be done because the values are compared in decreasing order of magnitude, and therefore it can be known that if a given comparison fails to satisfy the threshold TH, then all subsequent comparisons will also satisfy the threshold TH.

As used herein, testing the comparison results against the threshold means determining whether the comparison are greater than or less than the threshold. In contexts in which the comparison includes subtracting two values, the threshold test may be "satisfied" if the absolute value of the comparison result is less than the threshold. In contexts in which the comparison includes dividing a larger value by a smaller value, the threshold test may be "satisfied" if the comparison result is less than the threshold. In contexts in which the comparison includes dividing a smaller value by a larger value, the threshold test may be "satisfied" if the comparison result is greater than the threshold. The case of the comparison result being equal to the threshold may be dealt with in any manner desired. For example, the threshold test may be "satisfied" if the comparison result is equal to the threshold. As another example, the threshold test may not be satisfied if the comparison result is equal to the threshold. As another example, the comparison results and the threshold may be set such that equality is not possible: for example, the comparison results may be rounded to a particular digit, and the threshold may be set to avoid being equal to that digit (e.g., the comparison results are rounded to the hundredths, and the threshold is set to include five thousandths).

In block 1014, the controller determines whether at least one of the RSSI comparison results from block 1013 satisfies the threshold TH test. If so, then the client device is in an overlap area and the process continues to block 1015. If not, then the client device is not in an overlap area and the process ends.

In block 1015, the controller identifies the client device as being stationary and in an overlap area. When the controller identifies a client device as being in an overlap area, the controller may also identify the overlapping APs. In some examples, the overlapping APs may be each AP whose RSSI satisfied the threshold TH in block 1013. In some examples in which only the highest and lowest RSSI values were compared in block 1013, the overlapping APs may be all of the APs in the set of candidates.

The identification of block 1015 may correspond to the detection of block 1001 of the process 1000. Thus, although FIG. 4 illustrates the process 1010 ending after block 1015, in some examples, block 1002 of the process 1000 may be performed in response to block 1015 of the process 1010 being reached.

Although the estimation of the RSSI values is illustrated as occurring in response to block 1011, this is merely for ease of description and could be otherwise. For example, RSSI values could be calculated for every client device periodically, without necessarily being in response to block 1011, and these values may be maintained in a database that may be referenced in block 1013 as needed.

2.3 Example Process of Determining Whether any Client Devices are in Overlap Areas The process 1020 of FIG. 5 will now be explained. The process 1020 is a process for comparing RSSI values to determine whether a client device is in an overlap area. The process 1020 is one specific example of how blocks 1013 through 1015 of the process 1010 may be performed.

In block 1021, the controller compares the highest value $RSSI_{AP1 \rightarrow CL}$ to the value $RSSI_{APn \rightarrow CL}$ and tests the result against the threshold TH. Specifically, the controller determines whether $RSSI_{AP1 \rightarrow CL} - RSSI_{APn \rightarrow CL} < TH$. In the first iteration, n=N.

If block 1021 is affirmative, the process continues to block 1022. If block 1021 is negative, the process continues to block 1023.

If block 1022 is reached, then the controller determines that the client device is in an overlap area, and that the overlapping APs are $AP_1$ through $AP_n$.

In block 1023, the controller decrements n by 1. The process then continues to block 1024.

In block 1024, the controller determines whether n=1. If so, then this means that the highest value $RSSI_{AP1 \rightarrow CL}$ has been compared to all of the other RSSI values, and none of them have satisfied the threshold. Thus, if block 1024 is affirmative, the process ends and the client device is determined to be not in an overlap area. However, if block 1024 is negative, this means that there are still RSSI values that can be compared to the highest value $RSSI_{AP1 \to CL}$, and therefore the process loops back to block 1021 for another iteration.

The process 1020 may be summarized as follows. The process 1020 starts by comparing the highest value $RSSI_{AP1 \to CL}$ to the lowest value $RSSI_{APN \to CL}$, and then proceeds to iteratively compare $RSSI_{AP1 \to CL}$ to $RSSI_{APn \to CL}$ for decreasing values of n until the comparison result satisfies the threshold TH test. When one of the comparison results satisfies the threshold test, an overlap area is detected and the process ends—additional comparisons are not needed, because it may be known that if $RSSI_{AP1 \to CL} - RSSI_{APn \to CL} < TH$ for a given value of n, then this must also be true for any lower value of n, since the RSSI values are sorted in descending order of magnitude. If none of the comparisons satisfy the threshold, then this means that the highest signal strength value $RSSI_{AP1 \to CL}$ is more than TH from all of the other signal strength values, and therefore the client device is not in an AP overlap area.

In the process 1020, the lowest value $RSSI_{APN \to CL}$ is compared first and n is decremented each iteration. However, it should be understood that a similar result could be obtained by starting by comparing the second highest value $RSSI_{AP2 \to CL}$ and incrementing n each iteration, as described above in relation to block 1013 of process 1010.

The process flow diagrams in FIGS. 3-5 and the descriptions herein are presented to aid the understanding of the example processes, but are not intended to be exhaustive descriptions thereof. For example, the example processes could include additional operations besides those illustrated in the Figures and described herein. As another example, the example processes could omit certain operations illustrated in the Figures and described herein. Furthermore, the operations are illustrated in a particular order for ease of description, but in practice some operations may be performed concurrently and/or in a different order than that illustrated. In addition, certain operations that were described separately for ease of understanding may, in practice, be performed together as part of a single operation.

3. Example Wireless Access Points

Figure 6:
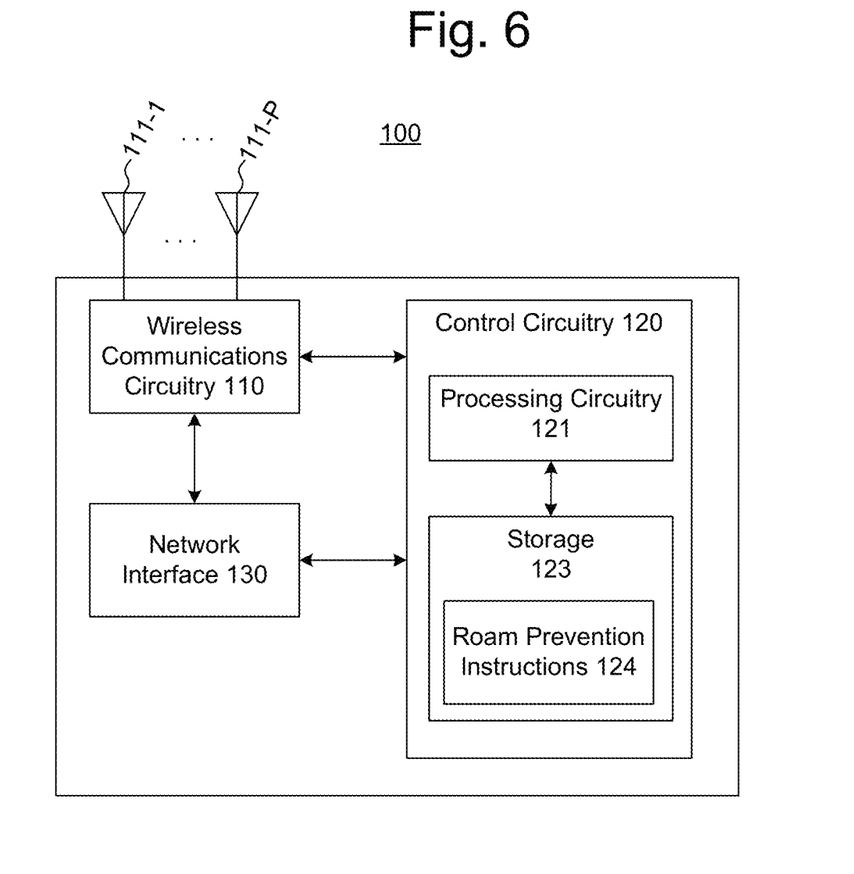
FIG. 6 is a block diagram illustrating an example AP to prevent stationary client devices from roaming in AP coverage overlap areas.

FIG. 6 illustrates an example wireless access point ("AP") 100. The AP 100 may be any wireless communications device that is to act as an access point for a client device 300. Specifically, the AP 100 may allow client devices 300 that are wirelessly connected thereto to communicate with one another, other devices, and/or an external network (such as the Internet) via various communications standards.

The AP 100 may include wireless communications circuitry 110, control circuitry 120, and a network interface 130. The wireless communications circuitry 110 may wirelessly transmit messages to client devices, such as the client devices 300 illustrated in FIG. 1. The wireless communications circuitry 110 may also receive messages wirelessly transmitted from the client devices 300. The network interface 130 may connect the AP 100 to a network, such as the Internet. In some examples, the control circuitry 120 may control the wireless communications circuitry 110. The control circuitry 120 may also control the network interface 130.

The wireless communications circuitry 110 includes P antennas 111 (111-1 through 111-P), where P is an integer equal to or greater than one. The antennas 111-1 through 111-P may transmit and/or receive signals in the form of electromagnetic radiation. Any portion of the electromagnetic spectrum may be used to transmit/receive messages. A transport protocol adopted by the AP 100 may specify a particular portion of the electromagnetic spectrum for transmission/reception (for example, IEEE 802.11ax specifies 2.4 Ghz and 5 Ghz bands). The wireless communications circuitry 110 may include a wireless chipset.

The wireless communications circuitry 110 may utilize one or more wireless communication techniques to transmit and receive wireless signals, such as multi-user-multiple-input-multiple-output (MU-MIMO), single-user MIMO (SU-MIMO), single-input-single-output (SISO), multiple-input-single-output (MISO), orthogonal-frequency-division single-access (OFDSA), orthogonal-frequency-division multiple-access (OFDMA), etc. In some examples, the wireless communications circuitry 110 may select a transmission and/or reception mode depending on a type of communication technology that a target client device 300 is capable of using.

The wireless communications circuitry 110 may generate data streams for transmission by packaging messages that are to be transmitted into transmission frames (e.g., MAC and PHY framing) according to the wireless transmission protocol adopted by the AP 100, mapping the transmission frames to transmission symbols according to a modulation scheme and modulating a carrier signal based on the transmission symbols, and wirelessly transmitting the modulated signals via amplifiers and the antennas 111-1 through 111-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation scheme; for example, IEEE 802.11ax specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using beamforming techniques. The precoding weights may be determined by the control circuitry 120.

The wireless communications circuitry 110 may also receive wireless transmissions from client devices via the antennas 111-1 through 111-P, and may demodulate the received signals via demodulation circuitry to obtain reception frames.

In some examples, the control circuitry 120 may be configured to perform some or all the roam prevention operations described herein. More specifically, the control circuitry 120 may be configured to perform some or all of the operations of FIG. 3, 4, and/or 5. In addition, the control circuitry 120 may also control the operations of the wireless communications circuitry 110 and/or the network interface 130. The control circuitry 120 may also generate control plane messages to be sent to client devices 200 via the wireless communications circuitry 110, and may process control plane messages received from client devices 200.

The control circuitry 120 includes processing circuitry 121, and, in some examples, storage 123. The processing circuitry 121 may include a number of processors (physical or virtual), dedicated hardware, or any combination of these.

As used herein, a "processor" may include (or be virtualized from) any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc. In examples in which the processing circuitry 121 includes processors, the processors may be configured to perform operations described herein, such as some or all of the operations of FIG. 3, 4, and/or 5, as a result of executing machine readable instructions, such as the roam prevention instructions 124. In examples in which the processing circuitry 121 includes processors, the control circuitry 120 may also include the storage 123 (physical or virtual), which may store the machine-readable instructions that are executed by the processors. In addition, in examples in which the processing circuitry 121 includes processors, the processing circuitry 121 may include components that support the processors and/or provide additional functionality, such as caches, coprocessors, timing sources, etc.

In examples in which the processing circuitry 121 includes dedicated hardware, such dedicated hardware may include any circuitry that is configured to perform operations described herein, such as some or all of the operations of FIG. 3, 4, and/or 5. For example, dedicated hardware may include application-specific integrated circuits (ASICs), complex programmable logic devices (CPLD), and so on.

In some examples in which the processing circuitry 121 includes both processors and dedicated hardware, some or all of such additional hardware components may be integrated into a same integrated circuit as the processor. In particular, in some such examples, the processing circuitry 121 may be a system-on-chip (SoC).

As noted above, in some examples the control circuitry 120 includes the storage 123, which may store the roam prevention instructions 124. The storage 123 may include (or be virtualized form) any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). The roam prevention instructions 124 may include instructions to perform some or all of the operations illustrated in FIGS. 3, 4, and/or 5. In examples in which the processing circuitry 121 is constituted entirely by dedicated hardware, the storage 123 and the roam prevention instructions 124 may be omitted.

The network interface 130 connects the AP 100 to a network, such as the Internet, via one or more intervening network devices (not illustrated). The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated and described separately herein, this is merely for ease of explanation and does not imply that these components are necessarily physically or logically separated. For example, the wireless communications circuitry 110 and the control circuitry 120 may share one or more of the same processors and/or ASICs, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

As used herein, "access point" (AP) can refer to a networking device that allows a client device to connect to a wired or wireless network. The term AP can, for example, refer to receiving points for any wireless access technology which is now known or may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

Specifically, as used herein, "access point" (AP) can refer to a networking device that allows a client device to connect to a wired or wireless network. The term AP can, for example, refer to receiving points for any wireless access technology which is now known or may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may include one or a plurality of radios. As used herein, a radio refers to hardware on an AP to receive signals and transmit the received signals to other components within the AP. The radio of an AP may receive signals from within the WLAN, such as wireless signals, or the radio may receive external signals, such as from sources outside the WLAN. The wireless communications circuitry 110 described above is an example of such a radio.

4. Example Non-Transitory Machine Readable Media

Figure 7:
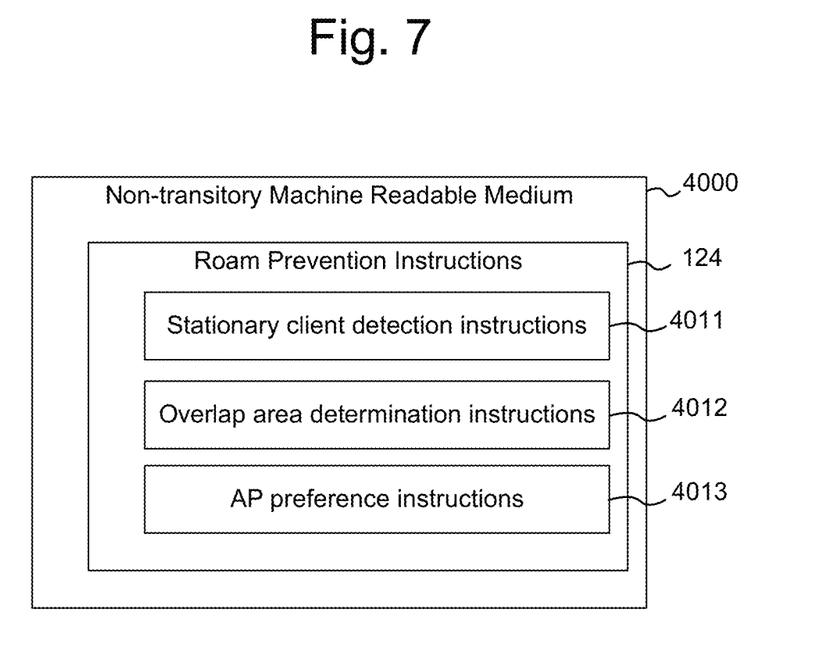
FIG. 7 is a block diagram illustrating an example non-transitory machine readable medium storing example roam prevention instructions.

FIG. 7 illustrates an example non-transitory machine readable medium 4000 that stores roam prevention instructions 124. The machine readable medium 4000 may include any non-transitory media that can store instructions and is readable by a machine, such as a memory device (e.g., RAM, persistent memory, USB drive, etc.), a hard disk drive, a solid-state drive, an optical disk (e.g., CD, DVD, Blu-ray, etc.), a magnetic disk, and the like.

The roam prevention instructions 124 may include instructions that are of such a nature that, when they are executed by processing circuitry of a controller that controls an AP, they cause the processing circuitry to perform the operations described above in relation to FIGS. 3, 4, and/or 5. For example, the roam prevention instructions 124 may include stationary client detection instructions 4011, overlap area determination instructions 4012, and AP preference instructions 4013. The controller whose processing circuitry executes the roam prevention instructions 124 may be the control circuitry of the individual AP (such as the control circuitry 120 described above), a controller external to the AP (such as the external controller 200 described above), or a virtual controller formed by a distributed system of APs.

The stationary client detection instructions 4011 may include instructions to detect stationary client devices. For example, the stationary client detection instructions 4011 may include instructions to perform the operations described above in relation to block 1001 of the process 1000 (FIG. 3) and/or block 1011 of the process 1010 (FIG. 4).

The overlap area determination instructions 4012 may include instructions to determine whether client device that has been identified as stationary is in an overlap area. For example, the overlap area determination instructions 4012 may include instructions to perform operations corresponding to block 1001 of the process 1000 (FIG. 3), blocks 1012 through 1015 of the process 1010 (FIG. 4), and/or blocks 1021 through 1024 of the process 1020 (FIG. 5).

The AP preference instructions 4013 may include instructions to select one of the overlapping APs as a preferred AP, and then cause the APs to avoid connecting with any clients that have been assigned another AP as a preferred AP. For example, the overlap area determination instructions 4012 may include instructions to perform operations corresponding to blocks 1002 and 1003 of the process 1000 (FIG. 3).

5. Definitions

Some of the electronic devices described above, such as the AP 100, may include some components that may be physical or virtualized, such as a processor of the processing circuitry 121, the storage 123, etc. Generally, for purposes of this disclosure, it does not matter whether the component(s) are physical or virtualized. Accordingly, any references herein and in the appended claims to any components of a device that do not specify "physical" or "virtual" should be understood to admit both physical and virtualized types of the components (in any combination). However, any virtualized component of a device is necessarily virtualized from underlying physical hardware. Accordingly, the recitation herein or in the appended claims of a given component of a device necessarily implies the presence somewhere in the system of physical hardware corresponding to the given component, with the given component either being one-and-the-same as the corresponding physical hardware or being virtualized from the corresponding physical hardware. Note that there is not necessarily a one-to-one ratio between physical hardware and the virtual components virtualized therefrom (one virtual component may span multiple physical components or multiple virtual components may share one physical component).

As used herein, a "processor" may include any logic circuitry that is capable of executing machine readable instructions stored in a non-transitory machine-readable medium (such as the storage 123, an optical disk, a magnetic disk, etc). For example, a "processor" (such as a processor of the processing circuitry 121) may be, for example, a central processing unit (CPU), a microprocessor, a microcontroller, a digital signal processor (DSP), etc.

As used herein, a "coprocessor" is a processor that is configured to supplement the functions of a primary processor. In certain examples, a coprocessor may be controlled by coprocessor instructions that are part of a primary processor's instruction stream. In other examples, a coprocessor may be independent of and capable of working asynchronously with the primary processor.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

While the above disclosure has been shown and described with reference to the foregoing examples, it should be understood that other forms, details, and implementations may be made without departing from the spirit and scope of this disclosure.

What is claimed is:

1. A method of controlling a network of wireless access points (APs), including:
    monitoring one or more client devices, including a first client device, in a network including a plurality of APs, the plurality of APs operating jointly as a virtual controller for the plurality of APs;
    determining by the plurality of APs that the first client device is stationary and is located in an AP-overlap area in which there is an overlap between coverage areas of two or more of the plurality of APs, wherein determining by the plurality of APs whether the first client device is in the AP-overlap area is based at least in part on a comparison of AP-to-client signal-strength values to a threshold;
    in response to the detection that the first client device is stationary and is located in the AP-overlap area, the plurality of APs further:
        assigning a first AP of the two or more APs to be a preferred AP for the client device, and
        preventing roaming by the first client device, including directing any AP of the plurality of APs other than the first AP to avoid connecting with the client device while the client device is stationary; and in response to a detection that the first client device is no longer stationary, the plurality of APs further:
  clearing the assignment of the first AP as the preferred AP for the first client device, and
  allowing roaming by the first client device to resume, including allowing APs of the plurality of APs in addition to the first AP to connect with the first client device.

2. The method of claim 1, wherein:
determining by the plurality of APs whether the first client device is in the AP-overlap area includes:
  comparing AP-to-client signal-strength values for the two or more APs to one another, and
  testing a result or results of the comparison against a threshold, wherein the first client device is determined to be within the AP-overlap area upon determining that the result or results is less than the threshold.

3. The method of claim 1, wherein:
determining by the plurality of APs whether the first client device is in the AP-overlap area includes:
  determining a set of AP-to-client signal-strength values; and
  comparing a largest one of the AP-to-client signal-strength values (first value) to another one of the AP-to-client signal-strength values (second value) and testing a result of the comparison against a threshold, wherein the first client device is determined to be within the AP-overlap area upon determining that the result or results is less than the threshold.

4. The method of claim 3,
wherein comparing the first value to the second value includes subtracting the second value from the first value.

5. The method of claim 3,
wherein comparing the first value to the second value includes dividing the second value by the first value.

6. The method of claim 3,
wherein the second value is a lowest one of the AP-to-client signal-strength values.

7. The method of claim 3,
wherein the set of AP-to-client signal-strength values consists of AP-to-client signal-strength values for those of the APs that the first client device has connected to within a specified period of time.

8. The method of claim 1, further comprising:
determining by the plurality of APs whether the first client device is in the AP-overlap area in response to detecting that the first client device has roamed between multiple of the APs of the plurality of APs more than a specified number of times within a specified period of time.

9. The method of claim 1, wherein:
determining by the plurality of APs whether the first client device is in the AP-overlap area includes:
  determining by the plurality of APs a set of AP-to-client signal-strength values, and
  detecting that the first client device is in the AP-overlap area by iteratively comparing a largest one of the AP-to-client signal-strength values (first value) to another one of the AP-to-client signal-strength values (second value) and testing a result of the comparison against a threshold;
  wherein, in a first iteration, the second value is a second highest one of the AP-to-client signal-strength values, and each subsequent iteration the second value is a next lower one of the AP-to-client signal-strength values.

10. The method of claim 1, wherein:
determining by the plurality of APs whether the first client device is in the AP-overlap area includes:
  determining by the plurality of APs a set of AP-to-client signal-strength values, and
  detecting that the first client device is in the AP-overlap area by iteratively comparing a largest one of the AP-to-client signal-strength values (first value) to another one of the AP-to-client signal-strength values (second value) and testing a result of the comparison against a threshold;
  wherein, in a first iteration, the second value is a lowest one of the AP-to-client signal-strength values, and each subsequent iteration the second value is a next higher one of the AP-to-client signal-strength values.

11. A non-transitory machine readable medium comprising instructions that are to, when executed by processing circuitry, cause the processing circuitry to:
  monitor one or more client devices, including a first client device, in a network including a plurality of wireless access points (APs), the plurality of APs operating jointly as a virtual controller for the plurality of APs;
  determine by the plurality of APs that the first client device is stationary and is located in an AP-overlap area in which there is an overlap between coverage areas of two or more of the plurality of APs, wherein determining by the plurality of APs whether the first client device is in the AP-overlap area is based at least in part on a comparison of AP-to-client signal-strength values to a threshold;
  in response to the detection that the first client device is stationary and is located in the AP-overlap area, the plurality of APs further to:
    assign a first AP of the two or more APs to be a preferred AP for the client device; and
    prevent roaming by the first client device, including directing any AP of the plurality of APs other than the first AP to avoid connecting with the client device while the client device is stationary; and
  in response to a detection that the first client device is no longer stationary, the plurality of APs further to:
    clear the assignment of the first AP as the preferred AP for the first client device, and
    allow roaming by the first client device to resume, including allowing APs of the plurality of APs in addition to the first AP to connect with the first client device.

12. The non-transitory machine readable medium of claim 11, wherein:
determining by the plurality of APs whether the first client device is in the AP-overlap area includes:
  comparing AP-to-client signal-strength values for the two or more APs to one another, and
  testing a result or results of the comparison against a threshold, wherein the first client device is determined to be within the AP-overlap area upon determining that the result or results is less than the threshold.

13. The non-transitory machine readable medium of claim 11, wherein:
determining by the plurality of APs whether the first client device is in the AP-overlap area includes:
  determining a set of AP-to-client signal-strength values; and comparing a largest one of the AP-to-client signal-strength values (first value) to another one of the AP-to-client signal-strength values (second value) and testing a result of the comparison against a threshold, wherein the first client device is determined to be within the AP-overlap area upon determining that the result or results is less than the threshold.

14. The non-transitory machine readable medium of claim 13, wherein:
comparing the first value to the second value includes subtracting the second value from the first value.

15. The non-transitory machine readable medium of claim 13, wherein:
comparing the first value to the second value includes dividing the second value by the first value.

16. The non-transitory machine readable medium of claim 13,
wherein the second value is a lowest one of the AP-to-client signal-strength values.

17. The non-transitory machine readable medium of claim 11, wherein:
determining by the plurality of APs whether the first client device is in the AP-overlap area includes:
determining by the plurality of APs a set of AP-to-client signal-strength values, and
detecting that the first client device is in the AP-overlap area by iteratively comparing a largest one of the AP-to-client signal-strength values (first value) to another one of the AP-to-client signal-strength values (second value) and testing a result of the comparison against a threshold;
wherein, in a first iteration, the second value is a second highest one of the AP-to-client signal-strength values or a lowest one of the AP-to-client signal-strength values, and each subsequent iteration the second value is a next lower one of the AP-to-client signal-strength values or a next higher one of the AP-to-client signal-strength values.

18. A non-transitory machine readable medium comprising instructions that are to, when executed by processing circuitry, cause the processing circuitry to:
monitor one or more client devices, including a first client device, in a network including a plurality of wireless access points (APs), the plurality of APs operating jointly as a virtual controller for the plurality of APs;
determine by the plurality of APs that the first client device is stationary and in response determine by the plurality of APs whether the first client device is in an AP-overlap area in which there is an overlap between coverage areas of the two or more APs by the following:
determine a set of AP-to-client signal-strength values for the two or more APs,
compare a largest one of the AP-to-client signal-strength values (first value) to another one of the AP-to-client signal-strength values (second value) and test a result of the comparison against a threshold, and
in response to a result of the comparison satisfying the threshold, determine that the first client device is located in the AP-overlap area; and
in response to the determination that the first client device is stationary and is located in the AP-overlap area, the plurality of APs to:
assign a first AP of the two or more APs to be a preferred AP for the client device; and
prevent roaming by the first client device, including directing any AP of the plurality of APs other than the first AP to avoid connecting with the client device while the client device is stationary; and
in response to a detection that the first client device is no longer stationary, the plurality of APs to:
clear the assignment of the first AP as the preferred AP for the first client device, and
allow roaming by the first client device to resume, including allowing APs of the plurality of APs in addition to the first AP to connect with the first client device.

19. The non-transitory machine readable medium of claim 18, wherein the instructions are to cause processing circuitry to:
estimate the AP-to-client signal-strength values from client-to-AP signal strength values.

20. The non-transitory machine readable medium of claim 18, wherein:
determining by the plurality of APs whether the first client device is stationary includes the plurality of APs:
determining a series of signal strength vectors for the client device based on probe reports collected from the APs over time;
determining distances between a first signal strength vector and the other signal strength vectors in the series; and
determining whether any of the distances exceed a specified threshold.

* * * * *